Sept. 29, 1964
B. CORDOBA ETAL
3,150,843
MOLDED SPRING REEL ASSEMBLY
Filed March 8, 1962
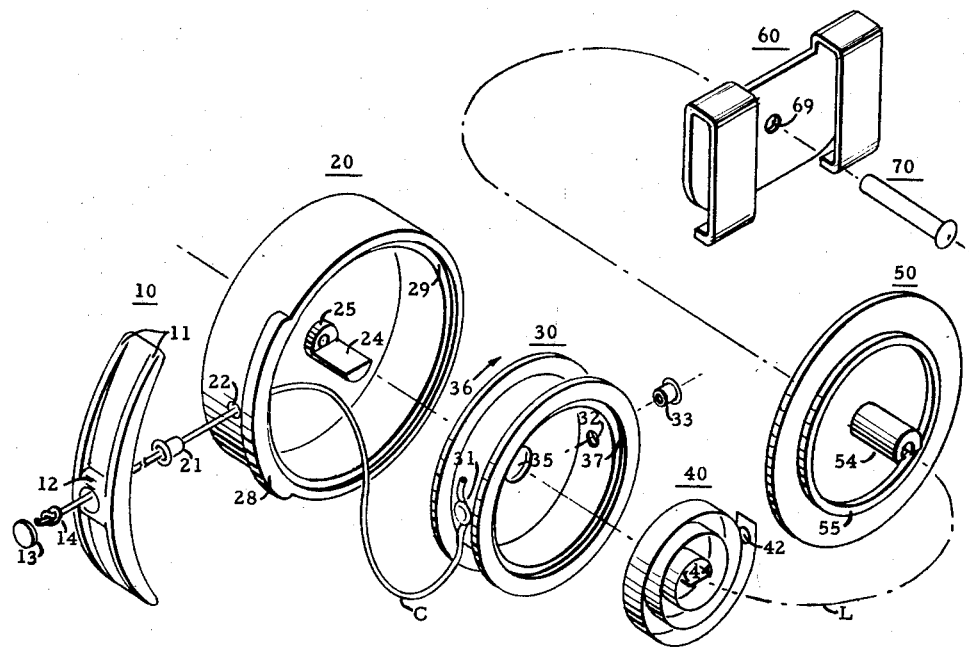
INVENTORS
BERNICE CORDOBA
LARRY L. LITTLE
By
*Lester S. Nkett*
ATTORNEY 3,150,843
MOLDED SPRING REEL ASSEMBLY
Bernice Cordoba, 956 N. Hoover, Los Angeles, Calif., and Larry L. Little, 2574 Carnegie St., Costa Mesa, Calif.
Filed Mar. 8, 1962, Ser. No. 178,410
1 Claim. (Cl. 242—107)

This invention relates to a molded reel assembly and, more particularly to a compact dog leash which comprises a cord wound on a spring tensioned reel.

Spring tensioned reels have been adapted for a wide variety of uses in the prior art. Such devices are used for closing screen doors, for tensioning clothes lines, for fishing line winding, and many other and sundry usages.

The problem which lead to the development of the present invention is to produce a compact molded reel assembly at a cost sufficiently low that such a device can be sold as part of a dog leash accessory or leash for other type of pet.

This problem is complicated by many factors. A reel that is easy to assemble and will provide a good operating life under the expected stresses and strains of normal usage may be very difficult to produce through the use of conventional molding techniques. Contrariwise, a reel that can be molded without difficulty may be difficult to assemble and/or have operational or duration limitations.

The present invention comprises a number of devices which, considered as a whole, result in a very low cost molded reel assembly which has an excellent operation capability and life time and is easy to assemble.

Accordingly, it is a general object of the present invention to provide a low cost molded reel assembly.

Another object is to provide a molded reel assembly which is easy to mold.

A further object is to provide a molded reel assembly which is easy to operate when assembled.

Still another object is to provide a molded reel assembly which has a long operating life.

A specific object of the invention is to provide a compact, low cost dog leash with a self-winding line.

The novel features which are believed to be characteristic of the invention, both as to its organization and method of operation, together with further objects and advantages thereof will be better understood after the following description considered in connection with the accompanying drawing. It is to be expressly understood, however, that the drawing is for the purpose of illustration and description only and is not intended as a definition of the limits of the invention.

The sole figure shows an exploded view in perspective of a disassembled reel assembly according to the invention. The major parts of this assembly are: a handle 10; top cover 20, reel 30, spring 40, lower cover 50, clip 60 and rivet 70. A cord C is connected to reel 30 as shown. Line L (dot-dash line) is shown to indicate the manner in which various parts are assembled. It will be noted that lower cover 50 is turned around from the view shown as it is assembled. The same is done with clip 60.

The following description will be made in the order of the reference numbering system of the figure and is not to be construed as an establishment of any order of priority of value or patentability with respect to the various novel features of the invention.

It will be noted that handle 10 has two parallel ribs 11 which have a thickness corresponding to the thickness of various parts of the assembly so that the cooling time of plastic to be molded will be approximately the same throughout. The center portion 12 of the handle has three concentric holes through it, each in a different plane. The outer hole, visible in the figure is made to receive a plug 13 which is to cover the knot 14 of cord C. The next inner hole has a diameter smaller than the size of knot 14 to prevent this knot from slipping through. The smallest hole is through the far side of handle 10 from the view of the figure and has a diameter which is just large enough to premit passage of cord C therethrough.

Cord C then passes through an eyelet 21 which is arranged to insert into hole 22 of top cover 20. This eyelet is required to prevent cord C from cutting the plastic mold when in operation.

Within top cover 20 is a split center post element 24 which, it will be seen, co-operates with split center post element 54 of lower cover 50 to form a slotted post for receiving portion 44 of spring 40. This arrangement is one of the unique features of the invention. The split post technique obviates the necessity of molding a slot which is difficult. It also obviates the necessity of providing a post with hole bored through which could not be molded.

In addition to providing a slotted center post, element 24 is terminated in a bearing surface 25 which co-operates with hole 35 of reel 30 to provide one bearing for the reel. The other bearing for reel 30 is obtained from flange 55 of lower cover 50 which fits into groove 37 of reel 30.

A shoulder 28 is provided on top cover 20 so that handle 10 when drawn to top cover 20 by the spring tension is caused to align itself along the circumference of top cover 20. The inner radius of handle 10 is made to be somewhat larger than the outer radius for cover 20 so that it can be withdrawn easily when in operation. A groove 29 is provided in top cover 20 to co-operate with lower cover 50 during assembly in providing a snug fit and smooth exterior after assembly.

Cord C is fastened to reel 30 by means of an eyelet 31. This is accomplished by first holding cord C over the hole through which the eyelet is to pass. Then the cord is pushed into the hole by means of a fork-like instrument to provide a double cord into the hole. When eyelet 31 is inserted, a double frictional engagement is created between the sides of eyelet and the sides of the hole into which it is inserted, thus providing a very secure cord retention means, which is one of the special features of the invention.

In addition to the hole which is provided in reel 30 to receive eyelet 31, another hole 32 is provided to receive rivet 33 which secures spring 40 to reel 30 by passing through hole 42 thereof. Spring 40 is selected to have a length and spring constant such that after being wound sufficiently by a clockwise rotation of inner portion 44 and insertion into reel 30, another two clockwise rotations of portion 44 will be sufficient to provide the desired tension on cord C as will be further considered below.

During the assembly, cord C is wound on reel 30 by turning the reel clockwise as indicated by arrow 36 until most of the slack has been taken up. It is then inserted in cover 20 with post 24 and bearing 25 passing through hole 35 thereof and also post 24 passing through the center of spring 40. Then spring 40 is wound approximately two times from the center portion 44 thereof to provide enough spring tension to hold the cord reasonably taut in holding handle 10 against the outside of cover 20.

After spring 40 has been given the desired final tension it is locked into this position by the insertion of post 54 of lower cover 50 through the center thereof, but with post 54 on the opposite side of portion 44 as is post 24. That is, the two flat surfaces of posts 24 and 54 form a slot within which spring 40 is held after assembly. This means that when handle 10 is pulled after assembly, reel 30 is caused to rotate counterclockwise and spring 40 is tensioned because hold 42 is attached to the reel by the attachment of rivet 33 thereto through hole 32 of reel 40. In this case the center portion 44 of spring 40 cannot rotate since it is held to outer cover 20 by the slot technique just described and the entire cover assembly is held by a technique which will now be considered.

Clip 60 which is shown in the figure is designed to slip over a dog's harness or collar and merely illustrates one of several possible means for securing the assembled reel to another object. The connection of this clip is accomplished by passing a final assembly rivet 70 through the center hole thereof which is aligned during assembly with the center hole of post 54, completed by the co-operation of the surface of post 24. The rivet is spread after passing entirely through all portions 20 through 60 of the assembly and provides a simple means of interconnection of all of the main portions of the assembly as well as clip 60. It will be understood, of course, that other clips may be employed as, for example, a wall or post clip which may be used to adapt the invention for use as a clothes line or the like.

From the foregoing description it should now be apparent that the present invention provides an effective technique for minimizing the problems of molding a compact spring tensioned reel while also assuring ease in assembly and good operation for a long life.

The split post technique obviates any necessity for forming a slotted post, and also provides a center hole for ease in assembly through the use of a single connecting rivet.

The reel bearing surfaces are obtained in a unique manner such that the outer cover 20 contains an inner bearing 25 which co-operates on one surface of the reel and cover 50 contains an outer bearing 55 which co-operates with the groove 37 of the reel. This technique provides a secure double radius bearing and also facilitates the entry of spring 40 into the center of reel 30.

While a specific arrangement has been shown to illustrate the principles of the invention it will be understood that the invention is not so limited but rather has a scope broadly defined by the following claim.

We claim:

The improvement in a molded spring tensioned line winding device comprising: a handle at the end of said line having a shape of a cylindrical section with ribs on the outer cylindrical surface thereof to conform to a mold thickness; and a cap shaped top cover for said winding device having an outer radius somewhat smaller than the inner surface of said handle to permit ease in removal thereof, said top cover also having a shoulder adapted to position said handle with its cylindrical surface lined up with that of said top, when said line is wound into said cover.

References Cited in the file of this patent
UNITED STATES PATENTS

| | | |
|---|---|---|
| 887,072 | Delaney | May 12, 1908 |
| 952,708 | Meahl | Mar. 22, 1910 |
| 2,250,171 | Wilkins | July 22, 1941 |
| 2,817,482 | Ruggiers et al. | Dec. 24, 1957 |